United States Patent [19]
Milosevic

[11] 4,188,630
[45] Feb. 12, 1980

[54] METHOD OF AND SYSTEM FOR AVOIDING COLLISIONS BETWEEN AIRCRAFT

[75] Inventor: Ljubimko Milosevic, Paris, France
[73] Assignee: Thomson-CSF, Paris, France
[21] Appl. No.: 961,099
[22] Filed: Nov. 16, 1978

Related U.S. Application Data

[63] Continuation-in-part of Ser. No. 939,228, Sep. 5, 1978, abandoned, which is a continuation of Ser. No. 694,245, Jun. 9, 1976, abandoned.

[30] Foreign Application Priority Data

Jun. 10, 1975 [FR] France .............................. 75 18059

[51] Int. Cl.² ............................................ G01S 9/44
[52] U.S. Cl. .............................. 343/9 R; 343/6.5 R; 343/7.6; 343/12 MD; 343/112 CA
[58] Field of Search .............. 343/7.6, 6.5 R, 6.5 LC, 343/9, 12 MD, 112 CA

[56] References Cited

U.S. PATENT DOCUMENTS

| | | | |
|---|---|---|---|
| 3,114,147 | 10/1963 | Kuecken | 343/112 CA |
| 3,195,136 | 7/1965 | Klein | 343/12 MD |
| 3,341,845 | 9/1967 | Deman | 343/6.5 LC |
| 3,344,420 | 9/1967 | Arsove | 343/6.5 R |
| 3,359,554 | 12/1967 | Heyden | 343/6.5 LC |
| 3,582,626 | 6/1971 | Stansbury | 343/112 CA |
| 3,893,114 | 7/1975 | Yamanaka et al. | 343/9 |
| 3,931,622 | 1/1976 | Freedman | 343/6.5 R |

*Primary Examiner*—S. C. Buczinski
*Attorney, Agent, or Firm*—Karl F. Ross

[57] ABSTRACT

To avoid collision between aircraft flying in the same general area, each aircraft has individually assigned to it a transmission interval or time slot for sending out data relating to its altitude, course and speed, successive time slots being distinguished by different carrier frequencies. From the received data, each aircraft determines the relative positions and speeds of other aircraft communicating with it. Upon finding itself on a collision or near-collision course with another aircraft, an aircraft initiates an accelerated exchange of information with that other aircraft to determine the passing distance thereof and, if necessary, to take collision-avoiding action.

6 Claims, 9 Drawing Figures

METHOD OF AND SYSTEM FOR AVOIDING COLLISIONS BETWEEN AIRCRAFT

CROSS-REFERENCE TO RELATED APPLICATION

This is a continuation-in-part of my copending application Ser. No. 939,228 filed Sept. 5, 1978, now abandoned, which is a continuation of Ser. No. 694,245 filed June 9, 1976, now abandoned.

FIELD OF THE INVENTION

My present invention relates to a method of and a system for preventing in-flight aircraft collisions by the evaluation of information received aboard a given aircraft from nearby aircraft periodically transmitting navigational data relating to their course, speed, altitude and so on.

BACKGROUND OF THE INVENTION

In another copending application, Ser. No. 686,657 filed May 2, 1976, now abandoned, I have disclosed an integrated digital inter-aircraft communication and location system. Insofar as relevant to the present invention, that system individually allots to each aircraft in a given area a recurrent time slot for the emission of their navigational messages, with different carrier frequencies assigned to aircraft transmitting in consecutive time slots. The several carrier frequencies define a recurrent frame composed of a predetermined number of time slots which need not coincide with the number of intercommunicating aircraft; these time slots are established by pulses periodically emitted from an associated ground control station.

Aboard a given aircraft, the apparent velocity of another aircraft—i.e. the speed with which the two craft approach or recede from each other—can be determined on the basis of the Doppler shift, i.e. the deviation of the received carrier frequency from the nominal value of that frequency. If that Doppler shift is positive, the approach speed $V_d$ can be readily calculated. If the two craft are found to approach each other and are on the same altitude level, a possible collision course may be presumed. From the available speed and heading information, the true relative velocity can be vectorially ascertained. If the two craft are actually on a collision course, this relative velocity $V_r$ corresponds to the approach speed $V_d$; otherwise, $V_d = V_r \cos\alpha$ where $\alpha$ is the angle included between the two vectors as further discussed hereinafter (at large inter-aircraft distances, however, this angle approaches zero). From the delay $\Delta t$ between the arrival of a timing pulse from the ground control station and the reception of a message from the communicating aircraft to which the time slot initiated by this pulse is assigned, the first aircraft can obtain information on the minimum distance separating the two craft, that minimum distance being equal to $c\Delta t/2$ where c is the propagation velocity of the emitted radio waves. The actual distance may be considerably greater, depending upon the relative positions of the two aircraft and the ground station.

With these data, conventional arithmetic equipment aboard each aircraft can calculate a minimum closing time remaining up to the instant of closest approach; the mathematical basis for this calculation will be presented below. Such calculation, however, is valid only in first approximation, not only because of the limited reliability of the Doppler-shift evaluation (due to possible fluctuations in carrier frequency) but also in view of the aforementioned uncertainty in the determination of distance. Thus, an undue number of false alarms would result if a dropping of this minimum closing time below a certain safety threshold were taken as a signal to the crew of an aircraft to take collision-avoidance measures.

OBJECTS OF THE INVENTION

The general object of my present invention, therefore, is to provide a method of avoiding such false alarms in an aerial-navigation system of the type referred to.

A related object is to provide means in such a system for carrying out this method.

SUMMARY OF THE INVENTION

In accordance with my present invention, the detection aboard a given aircraft of a presumed flight path of another aircraft crossing its own flight path with a minimum closing time less than a predetermined safety threshold does not immediately trigger an alarm but, instead, initiates a direct exchange of messages at an accelerated rate between the two aircraft. From this direct exchange, the initiating aircraft determines the distance D separating the two aircraft and the variation $\Delta D$ of that distance from one exchange cycle to the next. This distance variation $\Delta D$ is proportional to the apparent speed V of the other aircraft as seen from the initiating aircraft and is used, together with distance D, for calculating a passing distance s. Collision-avoiding measures are taken only when this passing distance s is found to be less than a predetermined magnitude.

The switchover from the evaluation of the Doppler shift to a more accurate speed determination by a repeated calculation of the actual inter-aircraft distance D, upon the initiation of the high-speed exchange, provides a considerably more reliable measure of the closing time $\tau$ than any conventional procedure, including the one outlined above. Moreover, the passing distance s can be computed almost immediately upon that switchover, thus when the closing time is still relatively long, to apprise the pilot of the possible need for changing course or velocity in order to avoid a collision. These calculations do not involve the ground control station and are also independent of possible fluctuations in the carrier frequency transmitted by the responding aircraft.

BRIEF DESCRIPTION OF THE DRAWING

The above and other features of my invention will now be described in detail with reference to the accompanying drawing in which.

SPECIFIC DESCRIPTION

Figure 1A:
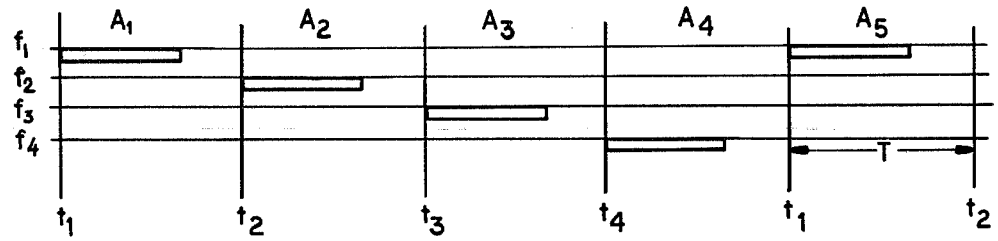
FIG. 1A is a graph showing the periodic emission of messages from several aircraft cruising in a certain area within reach of a ground control station.

As shown in FIG. 1A, a number of aircraft $A_1$, $A_2$, $A_3$, $A_4$, $A_5$. . . cruising within reach of a common ground control station periodically emit respective messages on frequencies $f_1$, $f_2$, $f_3$ and $f_4$ individually assigned to them. The ground station broadcasts timing pulses or spikes at equispaced instants $t_1$, $t_2$, $t_3$, $t_4$, defining respective time slots in a recurrent frame of four such time slots; these spikes, of course, are received by the several aircraft at different times depending upon their distance from the transmitter of the control station. The duration T of each time slot, however, is sufficient to prevent any overlap between the recurrent messages emitted by different aircraft. Frequencies $f_1$–$f_4$ may each be used by more than one aircraft, as specifically illustrated for craft $A_1$ and $A_5$.

Figure 1B:
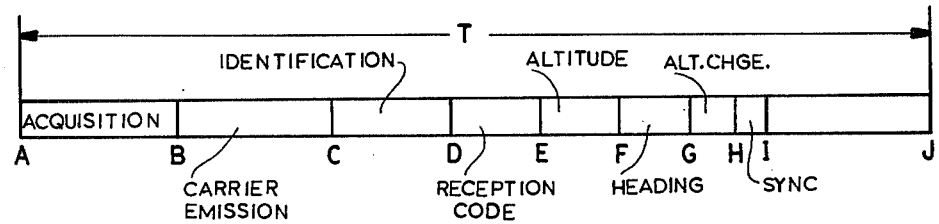
FIG. 1B is a diagrammatic representation of a message sent out from such aircraft.

In FIG. 1B I have shown a possible structure of such a recurrent message. It comprises an acquisition section A-B, a carrier-emission section B-C, a section C-D for the broadcasting of an identification code, a section D-E for sending out a reception code, a section E-F giving altitude information, a section F-G containing heading information, a section G-H reporting changes in altitude, and a section H-I for transmitting a synchronizing pulse. The balance I-J of the transmitting interval is reserved for propagation time.

Figure 2:
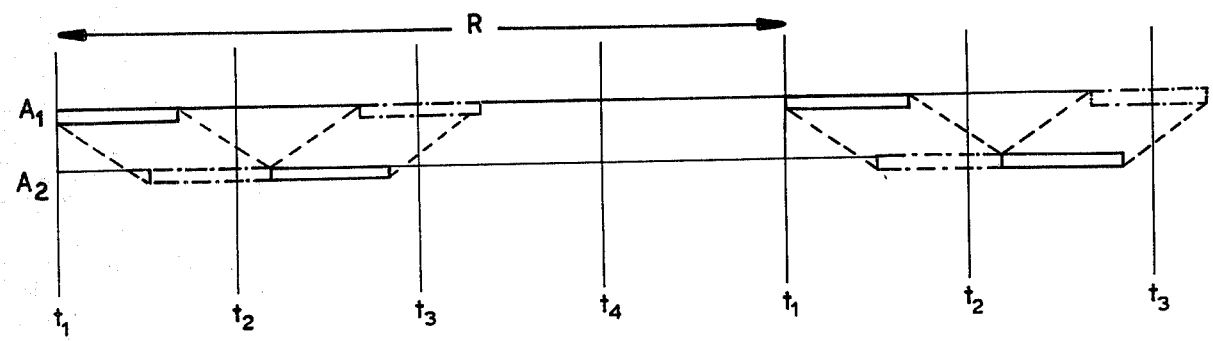
FIG. 2 is a graph showing an accelerated exchange of messages between two aircraft on a potential collision course.

From the altitude and heading information, as well as from the Doppler deviation of the carrier frequency transmitted in section B-C, each aircraft within range of the ground station can readily ascertain—by manual plotting or with the aid of a computer—whether any other aircraft is on a possible collision course with it and, if so, whether the presumed minimum closing time is less than a predetermined threshold. In the latter case it switches to a rapid exchange of information with that other aircraft as illustrated in FIG. 2; the responding aircraft then sends out its own message immediately upon receiving the synchronizing pulse H-I from the inquiring aircraft so that the delay between incoming and outgoing sync pulses is a measure of the distance between the two aircraft, taking into account the length of the message. This exchange of information may be carried out on their respective frequencies ($f_1$ and $f_2$ in the case of aircraft $A_1$ and $A_2$, as represented in FIG. 2) with a modified reception code, for example, to indicate this stage of communication; alternatively, a separate frequency channel may be utilized for this purpose. Naturally, the messages thus transmitted must also carry a code identifying the other aircraft involved in the exchange; reference may be made in this connection to U.S. Pat. No. 3,341,845, for example.

Figure 3B:
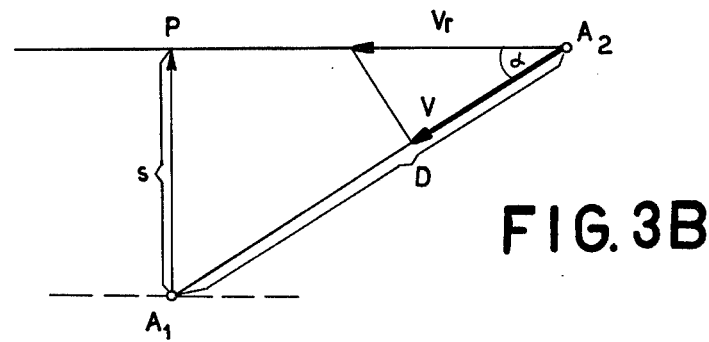
FIG. 3B is a vector diagram showing the relative position of the two aircraft at a certain point of their approach.
Figure 3C:
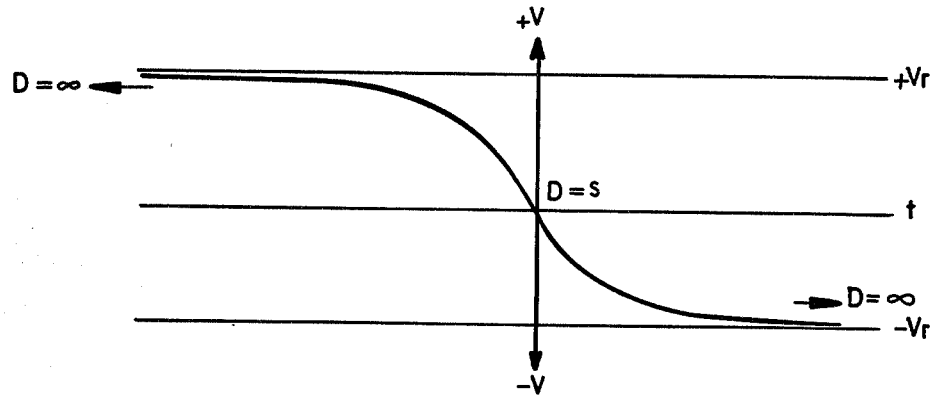
FIG. 3C is a graph showing the relative velocity of the two aircraft over a period including the instant of closest approach.
Figure 3D:
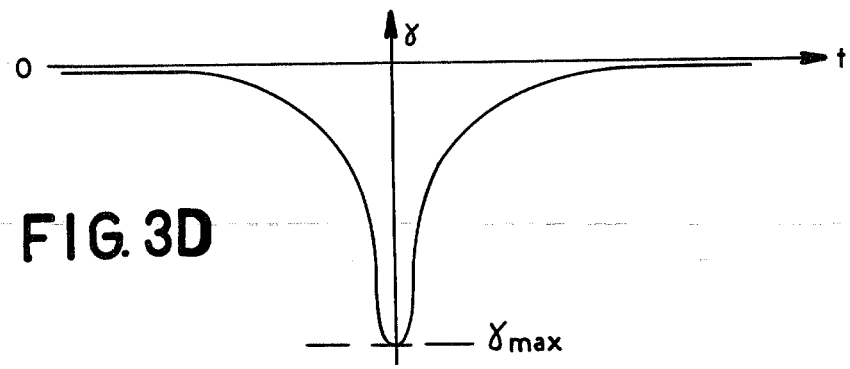
FIG. 3D is a graph showing the relative acceleration of the two aircraft over the same period.
Figure 3A:
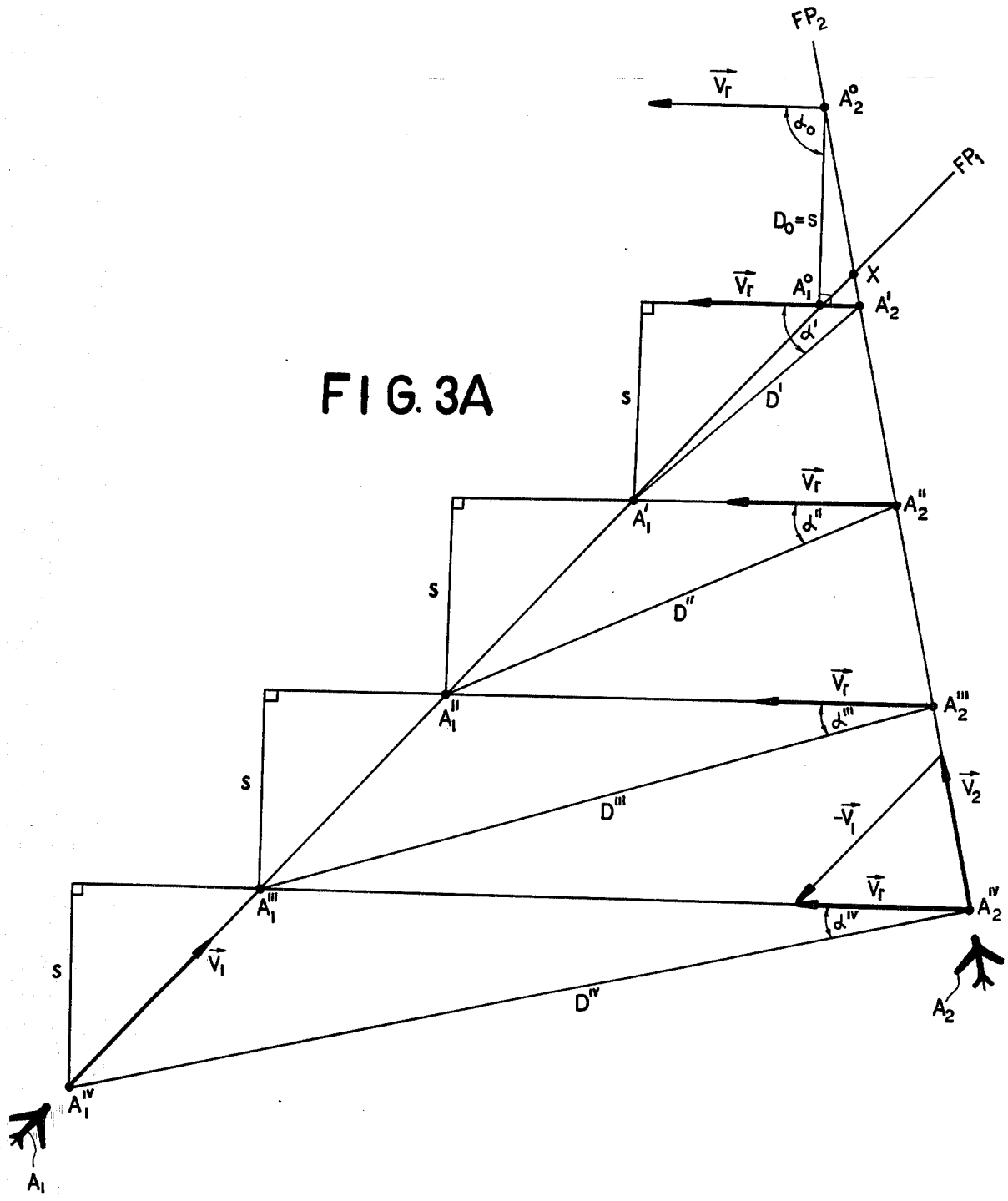
FIG. 3A is a vector diagram showing the flight paths and absolute velocities of the two aircraft.

In FIG. 3A I have shown the two aircraft $A_1$, $A_2$ headed toward an intersection X of their respective flight paths $FP_1$ and $FP_2$ at speeds $V_1$ and $V_2$, it being assumed that each craft travels at a substantially constant velocity and on a straight line. The relative velocity of these aircraft is indicated at $V_r$ and is considered invariant over the period under discussion. Successive positions of aircraft $A_1$, reached after a series of equal time intervals, are shown at $A_1^{vi}$, $A_1'''$, $A_1''$, $A_1'$ and $A_1°$; corresponding positions of aircraft $A_2$ have been designated $A_2^{iv}$, $A_2'''$, $A_2''$, $A_2'$ and $A_2°$. In these positions the two aircraft are separated by progressively decreasing distances $D^{iv}$, $D'''$, $D''$, $D'$ and $D°=s$, the latter being known as the passing distance and marking the closest approach of the craft to each other. The angle included between these distances and the vector $V_r$, designated $\alpha^{iv}$, $\alpha'''$, $\alpha''$, $\alpha'$ and $\alpha°$ for the several positions referred to, increases progressively from near-zero (with the two craft widely separated) to 90° at the instant of closest approach. The passing distance s is seen to be perpendicular to the relative velocity $V_r$.

FIG. 3B represents one of the triangles of FIG. 3A defined by the inter-aircraft distance D, the passing distance s and the speed vector $V_r$ including an angle $\alpha$ with line D. This distance D changes at a rate $dD/dt = V$, with the distance variation or apparent speed V given by $$V = V_r \cos\alpha \quad (1)$$

The point of closest approach (or of collision with $s=0$), as seen from aircraft $A_1$, has been indicated at P. Passing distance s satisfies the relationship $$s/D^2 = 1 - V^2/V_r^2 \quad (2)$$

The apparent speed V has been plotted against time t in FIG. 3C. As can be seen from that graph, V goes through zero for $D = s$.

The apparent acceleration $\gamma = dV/dt$, plotted against time t in FIG. 3D, has its maximum absolute value $\gamma_{max}$ at $D - s$. Its value is given by $$\gamma_{max} = V_r^2/s \quad (3)$$

With aircraft $A_2$ moving at speed $V_r$ toward the point of closest approach P as seen from aircraft $A_2$ (FIG. 3B), the closing time $\tau$ is given by $$\tau = \frac{\sqrt{D^2 - s^2}}{V_r} = \frac{D\sqrt{1 - \frac{s^2}{D^2}}}{V_r} = \frac{D\cos\alpha}{V_r} = \frac{D\cos^2\alpha}{V} \quad (4)$$

If the two craft were in fact on a collision course, that closing time would reduce (with $s=0$) to $$\tau = D/V = \tau/\cos^2\alpha \quad (5)$$

(since $V_r = V$ under these circumstances).

With the minimum relative distance D and the approximate approach velocity V known aboard aircraft $A_1$ from the normal radiocommunication described with reference to FIGS. 1A and 1B, a tentative closing time $\tau$ in conformity with equation (5) can be calculated from these data. In certain instances the closing time $\tau$ may be slightly shorter, as per equation (5), but only if $s > 0$, i.e. if there is no real danger of collision.

When this tentative closing time drops below a predetermined safety threshold, a switchover to the rapid exchange according to FIG. 2 permits a more exact evaluation, without reliance on the Doppler shift, of distance D and, with it, of its derivatives V and $\gamma$. An extrapolation of the acceleration function $\gamma(t)$ to determine its maximum yields a projected value for the passing distance s, with substitution of V for $V_r$ in equation (3). Since $V<V_r$ in a noncollision situation, the actual passing distance will be larger in any case in which $\gamma_{max}$ has a finite value so that the error lies on the side of safety.

If and when this calculated passing distance s is found to be less than a predetermined magnitude, the pilot of aircraft $A_1$ will take collision-avoiding action such as a change in course and/or velocity. As long as these maneuvers do not involve a change in altitude, the ground-station controller need not intervene.

Obviously, the initial distance determination could also be based upon positional data if such information were included in the message transmitted by each aircraft.

Figure 4:
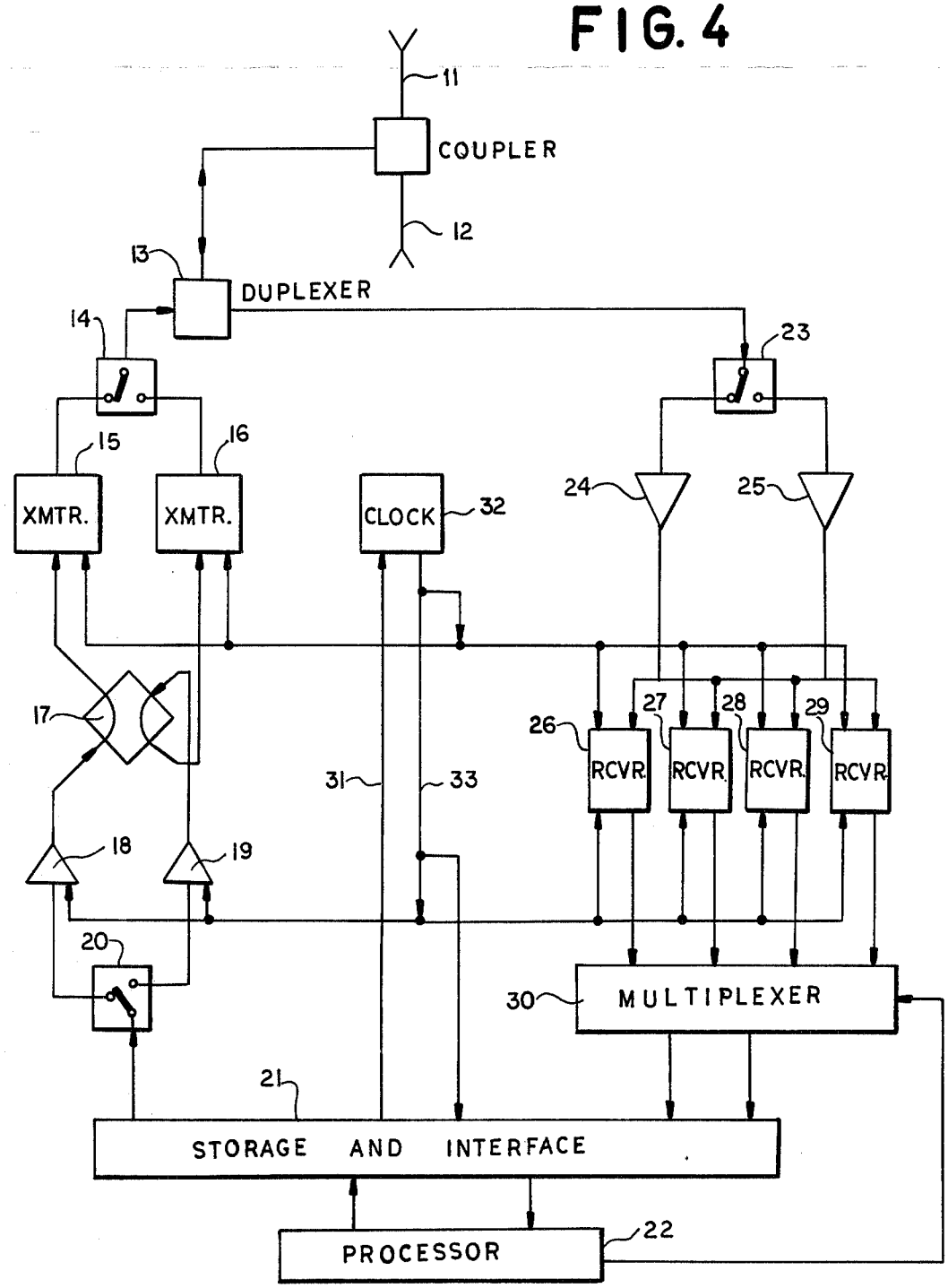
FIG. 4 is a block diagram of radiocommunication equipment on board an aircraft for emitting and receiving the messages of FIGS. 1A, 1B and 2.

In FIG. 4 I have illustrated, by way of example, certain on-board equipment that can be used to carry out the aforedescribed method of collision avoidance. The equipment comprises a coupler 10 with an array of antennas 11, 12 connected by it to a duplexer 13. The latter has an input alternately connectable by a switch 14 to a main transmitter 15 and an ancillary transmitter 16 which are energizable via a transformer 17 and pilot amplifiers 18, 19 as well as a switch 20 (ganged with switch 14) from an interface unit 21 including means for storing the data to be transmitted. Unit 21 co-operates with a processor 22 which obtains the information on altitude, heading etc. from nonillustrated measuring devices. Duplexer 13 also feeds incoming messages via a switch 23 and two alternately operable amplifiers 24, 25 to a set of receivers 26, 27, 28, 29 tuned to the several frequency channels $f_1-f_4$ used in the system. Through a multiplexer 30, controlled by processor 22, these receivers work into the storage circuits of unit 21.

Incoming timing pulses from the ground control station are relayed by memory 21 to processor 22 for establishing the several time slots $t_1-t_4$ described with reference to FIG. 1A. These timing pulses serve to synchronize, via a lead 31, a clock circuit 32 which delivers clock pulses via a lead 33 to the memory 21 and to the other circuit components.

Figure 5:
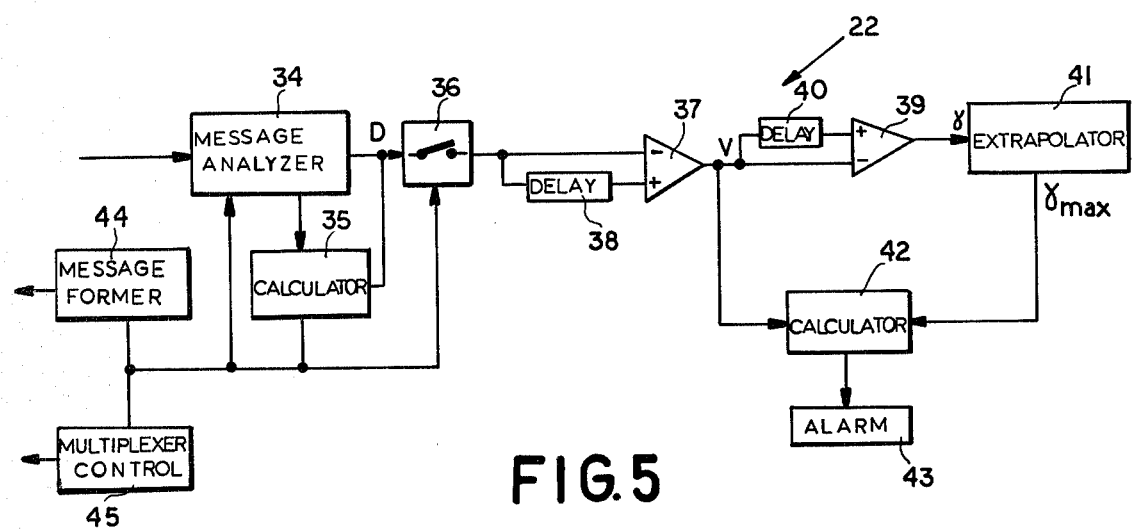
FIG. 5 is a partial block diagram of a processor forming part of the equipment of FIG. 4.

To the extent relevant in conjunction with my present invention, processor 22 may comprise the units shown in FIG. 5, including a message analyzer 34 normally determining minimum distance D and Doppler speed $V_d$, a calculator 35 operating on these parameters in accordance with equation (5) to emit an output signal whenever the minimum closing time tentatively determined during normal radiocommunication falls below its safety threshold, an electronic switch 36 closed by this output signal to feed the parameter D—now derived from an accelerated message exchange—to a first differentiator constituted by a comparator 37 with a subtractive input directly connected to switch 36 and an additive input connected thereto through a delay line 38, a second differentiator constituted by a comparator 39 with a subtractive input directly connected to comparator 37 and an additive input connected thereto through a delay line 40, and an extrapolator 41; all these units may operate digitally. The delay periods of lines 38 and 40 correspond to an exchange (interrogation/response) cycle as shown in FIG. 2.

Differentiator 37, 38 produces a signal representing the apparent velocity V derived from the distance decrement $\Delta D$; differentiator 39, 40 analogously generates a signal representing the apparent negative acceleration $\gamma$ derived from the velocity decrement $\Delta V$. Extrapolator 41 establishes the projected maximum deceleration $\gamma_{max}$ on the basis of successively obtained values of $\gamma$. Another calculator 42 operates on the parameters V and $\gamma_{max}$, pursuant to equation (3), to determine the passing distance s and to trigger an alarm device 43 if its value is less than the predetermined minimum. The output signal of calculator 35 also switches a message former 44 and a control circuit 45 for multiplexer 30 (FIG. 4) upon a changeover to the high-speed operation described in connection with FIG. 2; the operation of message analyzer 34 is concurrently modified, with a switchover from Doppler-shift evaluation to direct determination of distance D from the timing of the received response.

With a duration of 1.5 ms for each time slot $t_1-t_2$ etc, and thus of 6 ms for a frame period R, the message transmission from one aircraft to the other as shown in FIG. 2 may last for about 2 ms. Within an interval of 10 frames, or 60 ms, 15 exchange cycles may therefore take place between the intercommunicating aircraft, sufficient to allow for a determination of passing distance s as described above.

I claim:

1. A method of avoiding collision between aircraft carrying navigational equipment for the periodic transmission, during a recurrent time slot individually allotted to each aircraft in a given area, of data relating to altitude, course and speed of the respective aircraft and for plotting from received data the flight paths of nearby aircraft, comprising the steps of:
    monitoring aboard a given aircraft the flight paths of other aircraft communicating with said given aircraft;
    upon detecting aboard said given aircraft a presumed flight path of another aircraft crossing that of said given aircraft with a minimum closing time less than a predetermined safety threshold, initiating a direct exchange of messages at an accelerated rate between said given aircraft and said other aircraft;
    determining aboard said given aircraft, from said direct exchange, the distance D of said aircraft from said given aircraft and the variation $\Delta D$ of said distance D from one exchange cycle to the next;
    calculating aboard said given aircraft a passing distance s from the parameters D and $\Delta D$; and
    taking collision-avoiding measures upon said passing distance s having less than a predetermined magnitude.

2. A method as defined in claim 1 wherein aircraft transmitting during consecutive time slots have different carrier frequencies assigned to them, a series of said carrier frequencies defining a recurrent frame composed of a predetermined number of time slots.

3. A method as defined in claim 2 wherein said direct exchange takes place at the carrier frequencies respectively assigned to said given and other aircraft.

4. A method as defined in claim 1, 2 or 3 wherein the calculation of said passing distance involves a determination of the second derivative of said distance D with respect to time and an extrapolation of said second derivative to find a projected maximum absolute value of apparent acceleration.

5. A method as defined in claim 2 or 3 wherein said direct exchange takes place a plurality of times during each frame over a multiplicity of frames.

6. A system for avoiding collision between aircraft carrying navigational equipment for the periodic transmission, during a recurrent time slot individually alloted to each aircraft in a given aircraft, of data relating to altitude, course and speed of the respective aircraft and for plotting from received data the flight paths of nearby aircraft, comprising:

message-analyzing means aboard a given aircraft for determining, from data transmitted by nearby aircraft, the presence of another aircraft on a possible collision course with said given aircraft; calculating means connected to said message-analyzing means for computing a minimum closing time between said given aircraft and said other aircraft;

switchover means controlled by said calculating means for initiating a direct exchange of messages at an accelerated rate between said given aircraft and said other aircraft, upon detection of a minimum closing time less than a predetermined safety threshold;

arithmetic means connectable by said switchover means to said message-analyzing means for ascertaining the relative distance of said given and other aircraft from said direct exchange and determining a passing distance from said relative distance and its variation with time; and alarm means triggerable by said arithmetic means upon said passing distance falling short of a predetermined magnitude for alerting the crew of said given aircraft to the need for collision-avoiding measures.

* * * * *